Nov. 22, 1932.  E. A. THOMPSON  1,888,640
TRANSMISSION
Filed April 15, 1925  3 Sheets-Sheet 2

Witness:
Jas E Hutchinson

Inventor:
Earl A. Thompson,
By
Milans Milans
Attorneys

Nov. 22, 1932.  E. A. THOMPSON  1,888,640
TRANSMISSION
Filed April 15, 1925  3 Sheets-Sheet 3
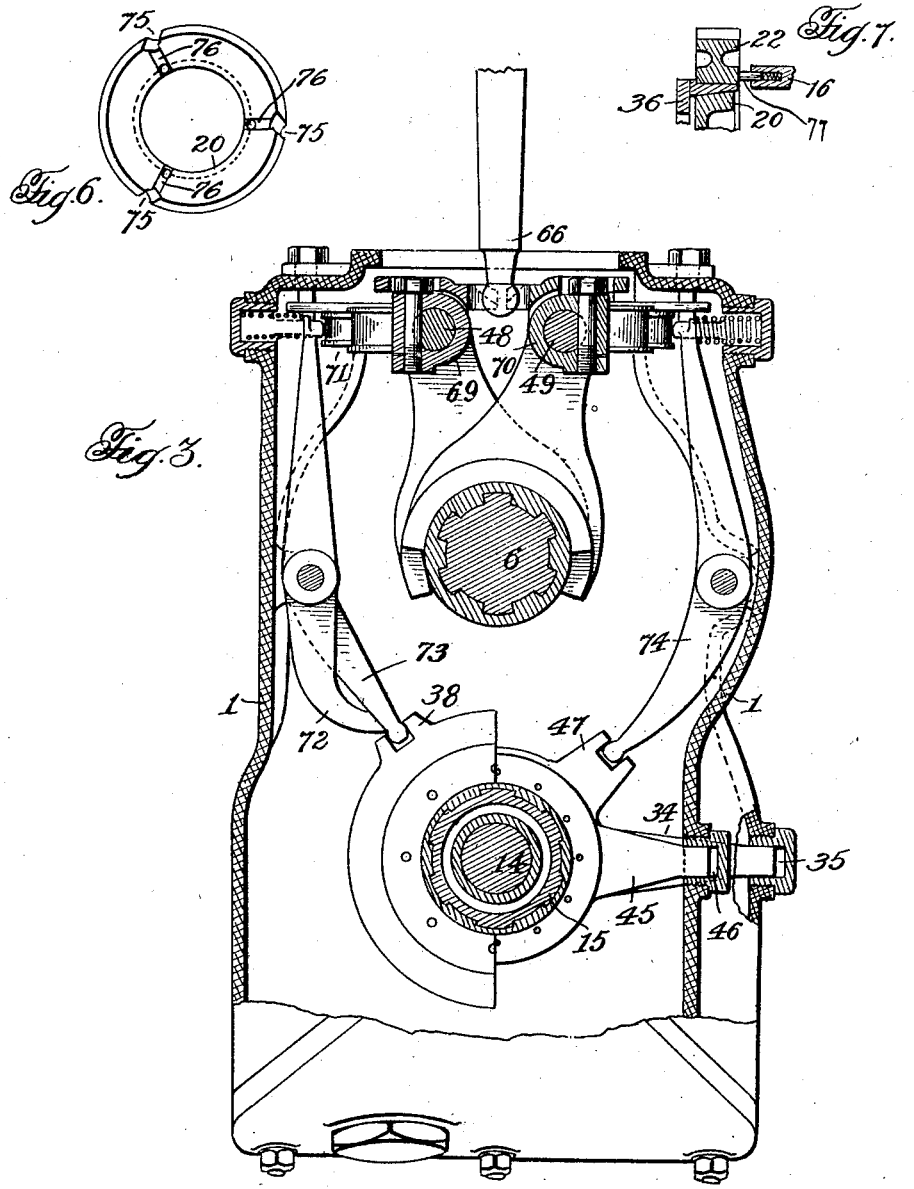
Witness:
Jas E. Hutchinson
Inventor:
Earl A. Thompson
By
Milans & Milans, Attorneys Patented Nov. 22, 1932

1,888,640

UNITED STATES PATENT OFFICE

EARL A. THOMPSON, OF PORTLAND, OREGON, ASSIGNOR TO GENERAL MOTORS CORPORATION, OF DETROIT, MICHIGAN, A CORPORATION OF DELAWARE

TRANSMISSION

Application filed April 15, 1925. Serial No. 23,221.

My present invention relates to new and useful improvements in power transmission mechanism and speed control means therefor, the principal object of the invention residing in the provision of means whereby there may be an intermeshing of the gears without clash or noise, the speeds of the gears being controlled so that the teeth of those gears which are to be meshed will be brought into intermeshable position.

With the above and other objects in view, which will appear as the description proceeds, my invention consists in the novel details of construction, and arrangement of parts described in the following specification and illustrated in the accompanying drawings, and while I have illustrated and described the preferred embodiments of the invention as they now appear to me, it will be understood that such changes may be made as will fall within the scope of the appended claims.

In the drawings:—

Fig. 3 is a transverse vertical section through the transmission housing with parts shown in elevation.

Fig. 4 is a diagrammatic detail of one of the speed control gears and its associated power gear.

Fig. 5 is an enlarged transverse vertical section through one of the crowder members.

Fig. 6 is a diagrammatic view showing the oil grooves in one of the conical bearing members, and Fig. 7 is a diagrammatic view showing a yieldable member for engaging the speed control gear for eliminating end play.

Figure 1:
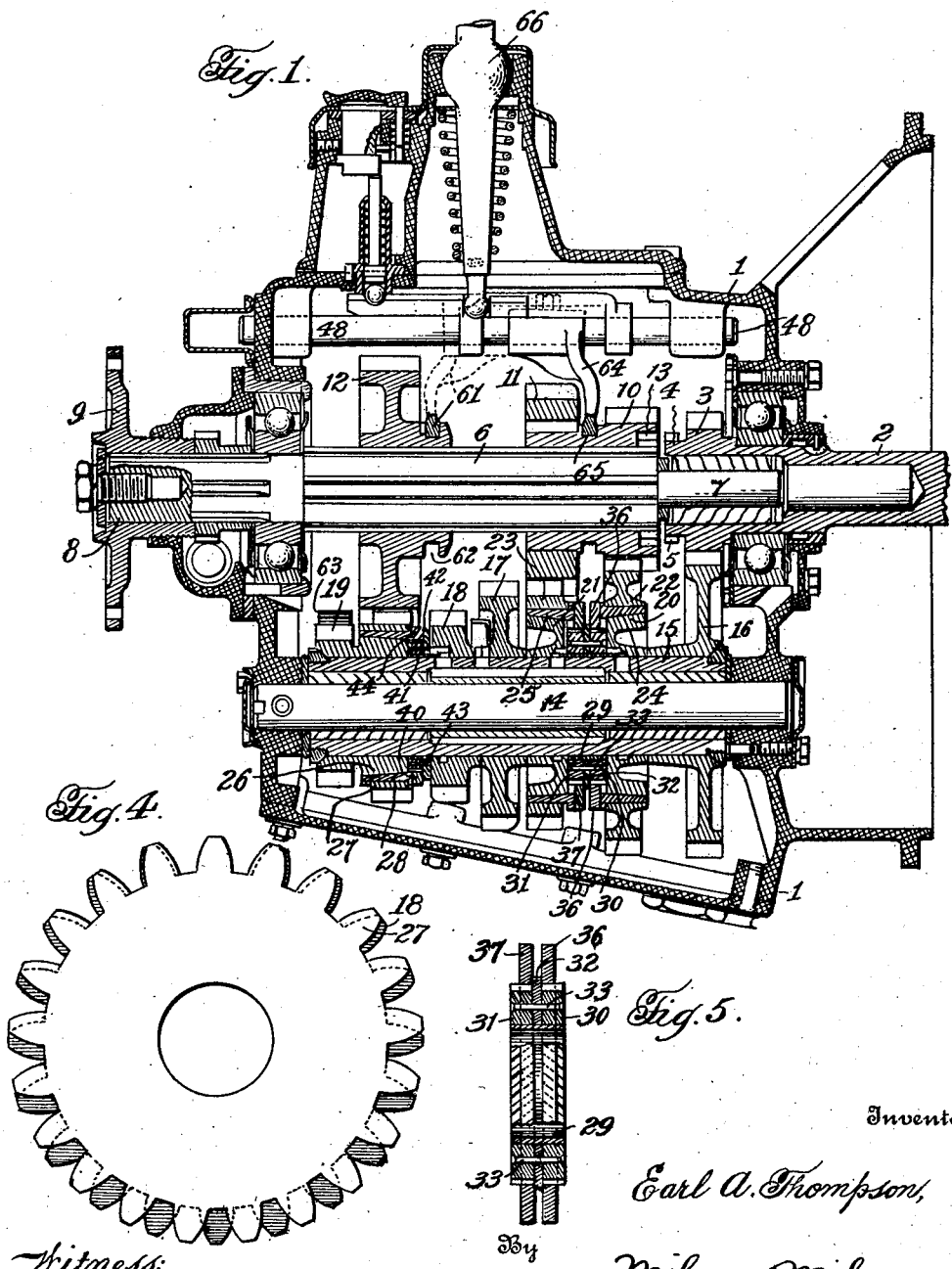
Fig. 1 is a longitudinal vertical section through the transmission housing with parts shown in elevation.
Figure 2:
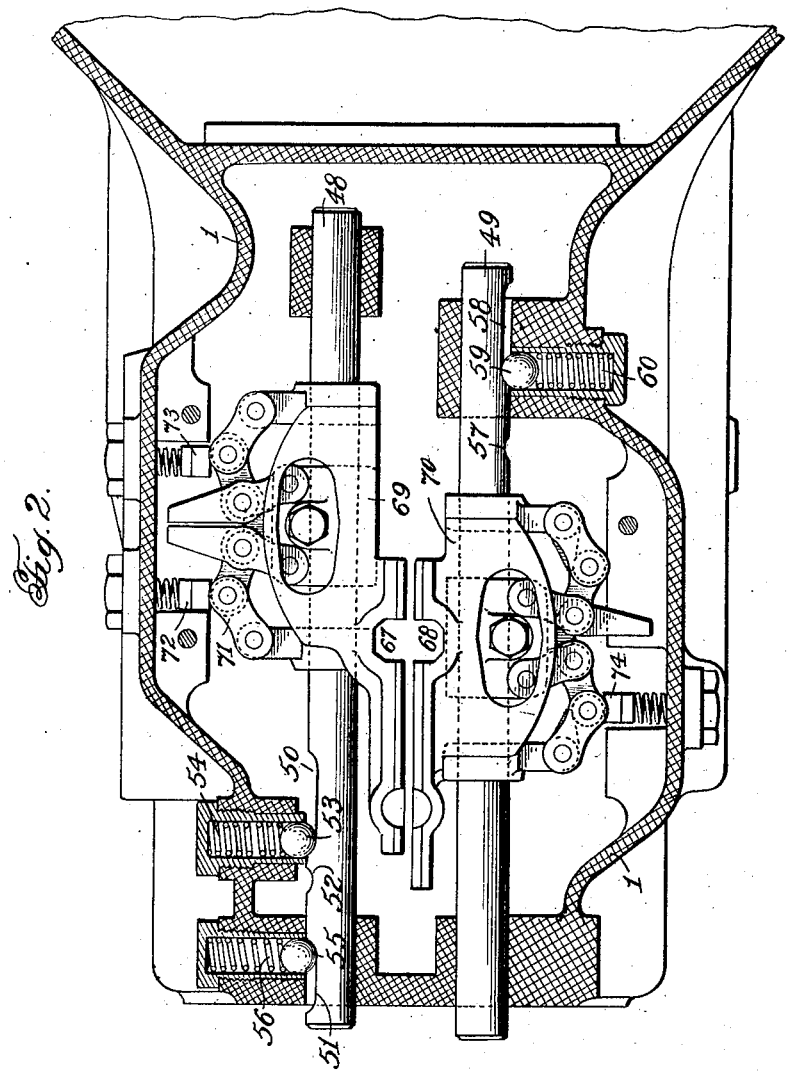
Fig. 2 is a horizontal section through the transmission housing with parts shown in plan.

In the drawings 1 indicates the housing of a motor vehicle transmission mechanism of usual construction and 2 the drive shaft carrying the clutch gear 3 which has the reduced portion 4 formed on its inner face and provided with the teeth 5. The drive shaft is mounted in the usual ball bearings and as the same forms no part of the present invention a detail description thereof is not thought necessary. The driven shaft is shown at 6 and has the reduced end 7 received in a suitable bearing in the hollow end of the drive shaft 2. The opposite end of the driven shaft 6 is reduced as shown at 8 and has secured to its outer end the universal joint flange 9. The end 8 of the driven shaft will be supported in suitable bearings.

Carried by the driven shaft 6 are the gear wheels 10, 11 and 12, the outer face of the gear 10 being recessed and provided with the teeth 13 adapted to mesh with the teeth 5 formed on the clutch gear 3 when the gear is shifted to secure a direct or high speed drive from the drive shaft 2. A shaft 14 for supporting the tubular countershaft is supported in the ends of the transmission housing in the usual manner. Rotatably mounted on suitable bearings received around the shaft 14 is a sleeve 15 constituting the countershaft to which are keyed the gears 16, 17, 18 and 19 the gear 16 being constantly in mesh with the clutch gear 3 as is quite clearly shown in the drawings. Also keyed to sleeve 15 are the conical members 20 and 21 around which are adapted to normally rotate the gears 22 and 23 respectively. A tapered bushing 24 is secured in the gear 22 and a similar tapered bushing 25 is secured in the gear 23, the taper of these bushings corresponding with the taper of their supporting members 20 and 21. Extending from the inner face of the gear 19 is a conical member 26 around which normally freely rotates the gear 27. A tapered bushing 28 is secured in the gear 27 the taper of the bushing corresponding with the taper of the supporting member 26. The externally conoidal members 20, 21 and 26 constitute elements of friction clutches cooperating with the internally conoidal members 24, 25 and 28 secured within the speed controlling or synchronizing gears 22, 23 and 27.

Keyed upon the sleeve 15, between the members 20 and 21, is the spacer sleeve 29. Mounted on the spacer 29 is a stationary clutch crowder member comprising the rings 30 and 31, the outer peripheries of which are threaded for a purpose to be later described. Between the rings 30 and 31 is a plate 32 which is secured to the rings by means of rivets 33 or other suitable fastenings. Extending from the outer edge of the plate 32 is an arm 34 the end of which is received in a recess 35 formed in the transmission housing 1, this arm preventing rotation of the stationary crowder member relative to the sleeve 15. Mounted on the ring 30 of the stationary crowder member is the movable crowder member 36 and mounted on the stationary crowder ring 31 is the movable crowder member 37 these movable crowder members 36 and 37 being internally threaded and adapted to engage the ends of the bushings 24 and 25 respectively for the purpose of forcing the conical surfaces of the bushings into frictional driving engagement with the corresponding conical surfaces of their respective conical supporting members. Formed on the movable crowder member 37 is a notched lug or projection 38 and formed on the movable crowder member 36 is a similar notched lug or projection not shown.

Mounted on the sleeve 15, between the gear 18 and the member 26 is the spacer 40 and mounted on the spacer is the stationary member of a clutch crowder comprising a ring 41 and a plate 42. The ring 41 is secured to the plate 42 by means of the rivets or other suitable fastenings 43. The outer periphery of the ring 41 is threaded and engages the internal threads of the movable crowder member 44. The plate 42 has the arm 45, the outer end of which is received in a recess 46 formed in the transmission housing or casing 1. A notched lug 47 is formed on the outer periphery of the movable crowder member 44. The operation of the movable crowder member forces the conical surfaces of the tapered bushing in the gear 27 to engage the cooperating conical surfaces of supporting member 26. The plates 32 and 42 are of greater diameter than their associated threaded rings which form the stationary crowder members and act as abutments or stops for the movable crowder members to limit their movement away from the speed control gears which they operate.

Slidably mounted in the transmission adjacent the top thereof, are the shifter rods 48 and 49, the rod 48 having adjacent one end the elongated recesses 50 and 51 and the recess 52 therebetween. Normally received in the recess 50 is the ball 53 which is held in its extended position by means of the coiled spring 54 and normally received in the recess 51 is the ball 55 normally held in its extended position by means of the coiled spring 56. These spring controlled balls normally hold the rod 48 in its neutral position (that is, a position in which gear 11 is out of mesh with the counter shaft gear 17, and clutch teeth 13 are out of mesh with clutch teeth 5 on the drive shaft) and when the rod is shifted one or the other of the balls will be received in the recess 52 to hold the rod in its shifted position (wherein gears 11 and 17 are in mesh or clutch teeth 12 and 15 are interlocked). The rod 49 has adjacent one end the recesses 57 and 58, the recess 58 normally receiving the ball 59 which is yieldably held in its extended position by means of the coiled spring 60. When the ball is received in the recess 58 the rod 49 is held in its neutral position and when the rod is shifted the ball will be received in the recess 57 and hold said rod in its shifted position with gear 12 in mesh with counter shaft gear 18.

Secured to the rod 49 is a shifter fork 61 the lower end of which is received in the groove 62 formed in one face of the gear 12. Therefore as the rod 49 is shifted forward the gear 12 will be moved into mesh with the gear 18 to secure low speed or if shifted in the opposite direction will engage the reverse idler 63 for reverse. The gear 12 is normally in mesh with the speed control gear 27 and the teeth of the gear 12 are of greater width than the teeth of the speed control gear 27 so that when the gear 12 is moved either to the right or to the left to engage the gear 18 or the reverse idler gear 63 gear 12 will still remain in mesh with the speed control gear. Secured to the rod 48 is the shifter fork 64 the lower or forked end of which engages in a groove 65 formed in the flange of the gear 10. The gears 10 and 11 are normally in mesh with the speed control gears 22 and 23 respectively and the teeth of the gears 10 and 11 are of greater width than the teeth of the control gears so that as the gears 10 and 11 are shifted to the right to engage the teeth 5 with the teeth 13, to secure a direct high speed drive, the teeth of the gear 10 will remain in mesh with the speed control gear 22 and the teeth of the gear 11 will continue in mesh with the speed control gear 23. When the gears 10 and 11 are moved to the left so that the gear 11 will mesh with the gear 17 to obtain second speed the teeth of the gears 10 and 11 will still remain in mesh with their respective speed control gears 22 and 23. It will thus be seen that in all instances the power gears carried by the driven shaft 6 are always in mesh with their respective speed control gears and when the gears of the driven shaft are moved or shifted for intermeshable engagement with the power gears of the counter shaft they will not be moved from mesh with the speed control gears.

The gear shift lever, of the usual construction is shown at 66 and operates the shifter forks and the clutch crowder member in a manner similar to that set forth in my copending application filed April 15, 1925, Serial No. 23,222, and in view of the copending application it is thought that a detail description of the shifting mechanism and the means for setting the speed control mechanism in operation will not be necessary here. Suffice to say that the lower end of the gear shift lever 66 is adapted to be engaged in the recesses 67 and 68 formed in the yokes 69 and 70 respectively, the yokes being slidably mounted upon the shifter rods 48 and 49 and connected through means of the link connections 71 so that as the gear shift lever is operated the yokes will be slid to first set into operation the speed control mechanism and then to operate the shifter fork to shift the gears as is set forth in my copending application above referred to. The movable crowder members 36, 37 and 44 are operated through means of the rocker arms 72, 73 and 74 respectively which engage in the notched lugs formed on these crowder members, the rocker arms being operated by engagement of the link connections 71 in the manner as set forth in my copending application above referred to.

In order that the shiftable gears on the driven shaft 6 may be properly engaged or meshed with the power gears on the counter shaft it will be appreciated that their teeth must be brought into alignment or intermeshable position. I have found, in practice, that this can be accomplished by having a different number of teeth in the speed control gear than in its associated power gear. Preferably I will have one less tooth in the speed control gear than in the associated power gear; it will therefore be seen that at some point of the circumference of the two gears there will be substantially a perfect alignment of teeth. At this point the shiftable gear of the driven shaft may be moved into mesh with the desired power gear on the counter shaft, and this point will occur within one revolution under the worst possible conditions. These gears are quite clearly illustrated in Fig. 4 of the drawings.

The conical members are provided with oil grooves as shown at 75 more particularly in Fig. 6, these grooves being of a shape to circulate the oil over the friction surfaces to prevent wear when the parts are running idly and to permit free escape of excess oil when the clutches are being engaged. The oil scoop 76 directs the oil into the oil grooves shown.

For eliminating end play of the speed control gears I may provide the yieldable members shown at 77, Fig. 7, which engage the side faces of the gears and hold them against the movable crowder member.

Having fully described my invention what I claim as new and desire to secure by Letters Patent is:

1. A transmission including a driven shaft, a countershaft, a shiftable power gear mounted on one of said shafts, a power gear mounted on the other of said shafts, a normally freely rotatable gear mounted on said last mentioned shaft, and means for connecting the normally freely rotatable gear to its shaft, said means including a bushing, an exteriorly threaded stationary member and an interiorly threaded movable member thereon said movable member adapted to engage the bushing.

2. A transmission including a driven shaft, a countershaft, a shiftable power gear mounted on one of said shafts, a power gear mounted on the other of said shafts, a normally freely rotatable gear mounted on said last mentioned shaft, means for connecting the normally freely rotatable gear to its shaft, said means including a bushing, an exteriorly threaded stationary member, an interiorly threaded movable member mounted on said stationary member and adapted to engage the bushing, a notched projection formed on the movable member, and means engageable in said notched projection for rotating the movable member relative to the stationary member.

3. A transmission including a driven shaft, a countershaft, a shiftable power gear mounted on one of said shafts, a power gear mounted on the other of said shafts, a normally freely rotatable gear mounted on said last mentioned shaft, and means for connecting the normally freely rotatable gear to its shaft, said means including a bushing, an exteriorly threaded stationary member and an interiorly threaded ring rotatably mounted on the stationary member and means for rotating said ring to move the same into contact with the bushing.

4. A transmission including a driven shaft, a counter shaft, a shiftable power gear mounted on one of said shafts, a power gear mounted on the other of said shafts, a normally freely rotatable gear mounted on said last mentioned shaft, and means for connecting the normally freely rotatable gear to its shaft, said means including a tapered bushing, an exteriorly threaded stationary member and an interiorly threaded ring rotatably mounted on the stationary member and means for rotating said ring to move the same into contact with the bushing.

5. A transmission including a driven shaft, a counter shaft, a shiftable power gear mounted on one of said shafts, a power gear mounted on the other of said shafts, a tapered member mounted on said last mentioned shaft, a normally freely rotatable gear mounted on the tapered member, a stationary exteriorly threaded member positioned adjacent the normally freely rotatable gear and an interiorly threaded ring rotatably mounted on the stationary member and adapted to be operated to force the normally freely rotatable gear into engagement with the tapered member.

In testimony whereof I hereunto affix my signature.

EARL A. THOMPSON.